March 9, 1965 | J. E. MESCHI | 3,173,092
DELTA MODULATION SYSTEM
Filed Nov. 15, 1961
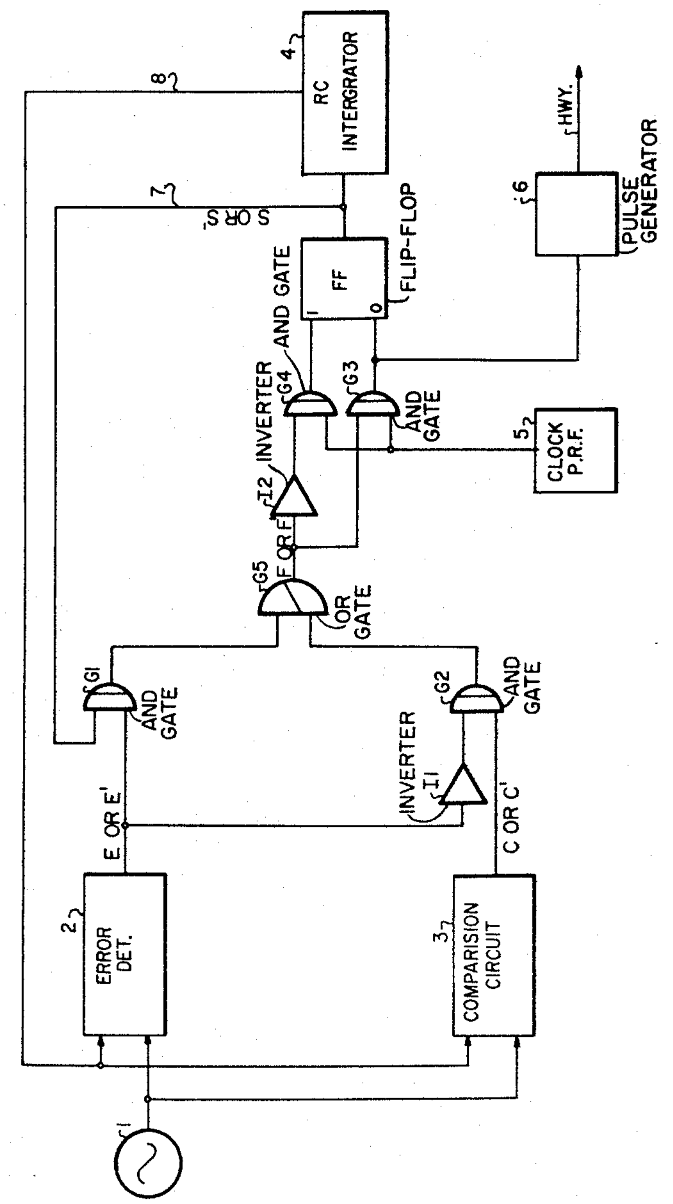
INVENTOR.
JOSEPH E. MESCHI
BY C. R. Gullbrandsen
ATTY.

United States Patent Office 3,173,092
Patented Mar. 9, 1965

3,173,092
DELTA MODULATION SYSTEM

Joseph E. Meschi, Villa Park, Ill., assignor to Automatic Electric Laboratories, Inc., Northlake, Ill., a corporation of Delaware Filed Nov. 15, 1961, Ser. No. 152,466
3 Claims. (Cl. 325—38)

This invention relates to delta modulation systems and more particularly to error correction in exponential delta modulation systems.

Present systems for exponential delta modulation use only one criterion to govern the charge-discharge condition on the integrating approximation circuit. They employ a comparison circuit to determine the difference in amplitude between the input audio signal and the approximate audio wave.

Whenever the approximation is less than the audio, the R-C combination of the approximation circuit is subjected to a voltage level which allows it to charge toward a higher fixed level. If the approximate signal happens to be greater in amplitude than the audio input signal then the approximation circuit is allowed to discharge toward a lower fixed voltage. These comparisons of amplitude occur during fixed periods of time determined by the repetition rate of a train of pulses.

Thus, present modulation systems of this type use only the comparison of amplitudes to determine whether or not a pulse of a certain type should be transmitted. These systems require that the rate of sampling be high and that a great number of pulses be transmitted. Under these conditions, the noise on the line may reach an undesirable level and can disrupt service.

It is, therefore, an object of this invention to provide a delta modulation system that will more accurately code the audio signal and produce less noise.

A feature of this invention provides for the use of the slope of the approximation and the magnitude of the error signal in addition to the comparison of amplitudes of signal as criteria for transmitting a pulse.

According to the principles of this invention, additional information is derived from the audio signal and the approximate signal, and this information is used to determine whether a pulse should be transmitted. Thus, it has been determined that the slope of the approximate signal and the magnitude of the error signal should be taken into account when deciding whether or not a pulse should be transmitted during a particular time period. In reducing the error of approximation and the sampling rate the following information was considered important: the slope of the audio, the slope of the approximation, the quantitative comparison of the error between approximation and audio to an arbitrary allowable error voltage V and the comparison of the audio amplitude to the approximation amplitude. Accordingly, these quantities were assigned the following designations: A for a positive audio slope and A′ for negative slope, S for positive approximation slope and S′ for negative slope, E for an error voltage larger than V and E′ for an error voltage less than V and C for audio greater than approximation and C′ for audio less than approximation.

It was determined that in terms of the above stated quantities a control function F should be generated under certain conditions to charge the integrator circuit and F′ would allow the integrator to discharge toward a lower voltage. Using the above stated quantities it was determined that in logical terms control functions F should be generated when any of the following conditions existed:

$$F = SEAC + SEA'C + (SEA)'C + (SE)'AC + (SE)'AC'$$

or $$(SEAC)' + S'EAC + S'EA'C$$

Simplification of this function gives:

$$F = S'E' + CE$$

Using suitable means to detect the quantities S, S′ E, E′ C and C′ a circuit was developed which generates the function F, taking into account the added criteria of slope of approximation, S or S′, and quantitative error comparison, E or E′.

It should be noted that the slope of the audio A, A′ dropped out of the expression in the simplification process and hence need not be generated.

A better understanding of this invention will be had and other embodiments will become obvious upon studying the following detailed description.

The drawing is a schematic representation of an embodiment of the invention including an audio signal source 1, an error detector circuit 2, a comparison circuit 3, inverters I1 and I2, AND gates G1, G2, G3, and G4, OR gate G5, flip-flop circuit FF, R-C integrator 4, generator 5, for timing signals, and pulse generator 6.

The audio signal source 1 may be a transmission highway, a telephone subset or other source. The audio signal of source 1 is applied to the error detector 2 and to the comparison circuit 3. Also applied to each of these circuits by means of lead 8 is the approximated signal developed at the R-C integrator 4. The comparison circuit 3 compares the amplitude of the audio signal with that of the approximation and produces an output C or C′ depending upon which signal is of greater amplitude.

The error detector circuit 2 compares the difference in amplitude between the approximate signal and the audio signal to a fixed voltage V, and generates a signal E or E′, depending on whether the difference between the input signal and the approximate signal is greater or less than V.

The output E or E′ of the error detector is applied directly to gate G1 along with a signal corresponding to the slope S or S′ of the approximate signal by means of lead 7 and through inverter I1 to gate G2, along with the output C or C′ of the comparison circuit. The gates G1 and G2 are arranged so that gate G1 produces an output signal when S′ and E′ are applied to its input terminals and gate G2 produces an output signal when C and E are applied to its input terminals. The output terminals of gates G1 and G2 are connected to the input terminals of OR gate G5. Thus, there will be an output from gate G5 when either gate G1 or G2 produces an output signal. The signal on the output terminal of gate G5 is then the desired function F or F′.

This signal F or F′ is applied directly to gate G3 and through inverter I2 to gate G4. A train of pulses from the timing pulse generator 5 is also applied directly to each of the gates G3 and G4. The output signals of these gates are applied directly to the set-reset flip-flop circuit FF.

When a signal F appears at the input to gate G3 along with a timing pulse, a signal appears at the output of gate G3 which is applied to FF and to pulse generator 6. The flip-flop FF then switches from a first state which may correspond to a −10 volt output signal to a second state, which may correspond to zero volts output or remains in said second state. In either case the output signal of gate G3 is applied to the pulse generator 6, and then to the transmission highway HWY. The signal F at the output of gate G5 is inverted by I2 and thus there is no output from gate, G4.

When the output signal of gate G5 is F′ there is no output from either gate G3 or pulse generator 6, but because F′ is inverted there is an output signal at gate G4, which causes flip-flop FF to switch from a second state to a first state or remain in said first state. When FF is in said first state the signal level on lead 7 may be −10 volts thus indicating a negative slope of approximation S′. And when FF is in said second state the signal level on lead 7 may be zero volts, thus indicating a positive slope of approximation S.

The output signal of FF is applied to R-C integrator 4, and the amplitude of the signal approximated by the integrator 4 is applied to lead 8, and thus to error detector 2 and comparison circuit 3.

What is claimed is:

1. In combination for converting an amplitude varying signal to a pulse signal, a source of a first amplitude varying signal, output means for forming and transmitting a pulse signal, pulse detecting means responsive to said pulse signal, integrating means responsive to said pulse detecting means for converting said pulse signal to a second amplitude varying signal which approximates said first amplitude varying signal, and logic means for controlling said output means, said logic means comprising comparison means connected to said source and to said integrating means for indicating a difference between said first and second amplitude varying signals, and error detecting means also connected to said source and to said integrating means for sensing a difference in amplitude between said two amplitude varying signals which is greater than a predetermined value.

2. A combination, as claimed in claim 1, wherein said logic means further comprises a first gate circuit, a second gate circuit and a third gate circuit, said third gate circuit being individually responsive to said first and second gate circuits to control said output means said first gate circuit being coincidently responsive to said two detecting means and said second gate circuit being coincidently responsive to said error detecting means and said comparison means.

3. A combination, as claimed in claim 2, wherein said logic means further comprises timing means for controlling said output means in coincidence with said third gate circuit.

References Cited by the Examiner

UNITED STATES PATENTS 2,816,267 12/57 De Jager et al. ________ 332—11

DAVID G. REDINBAUGH, *Primary Examiner.*